UNITED STATES PATENT OFFICE.

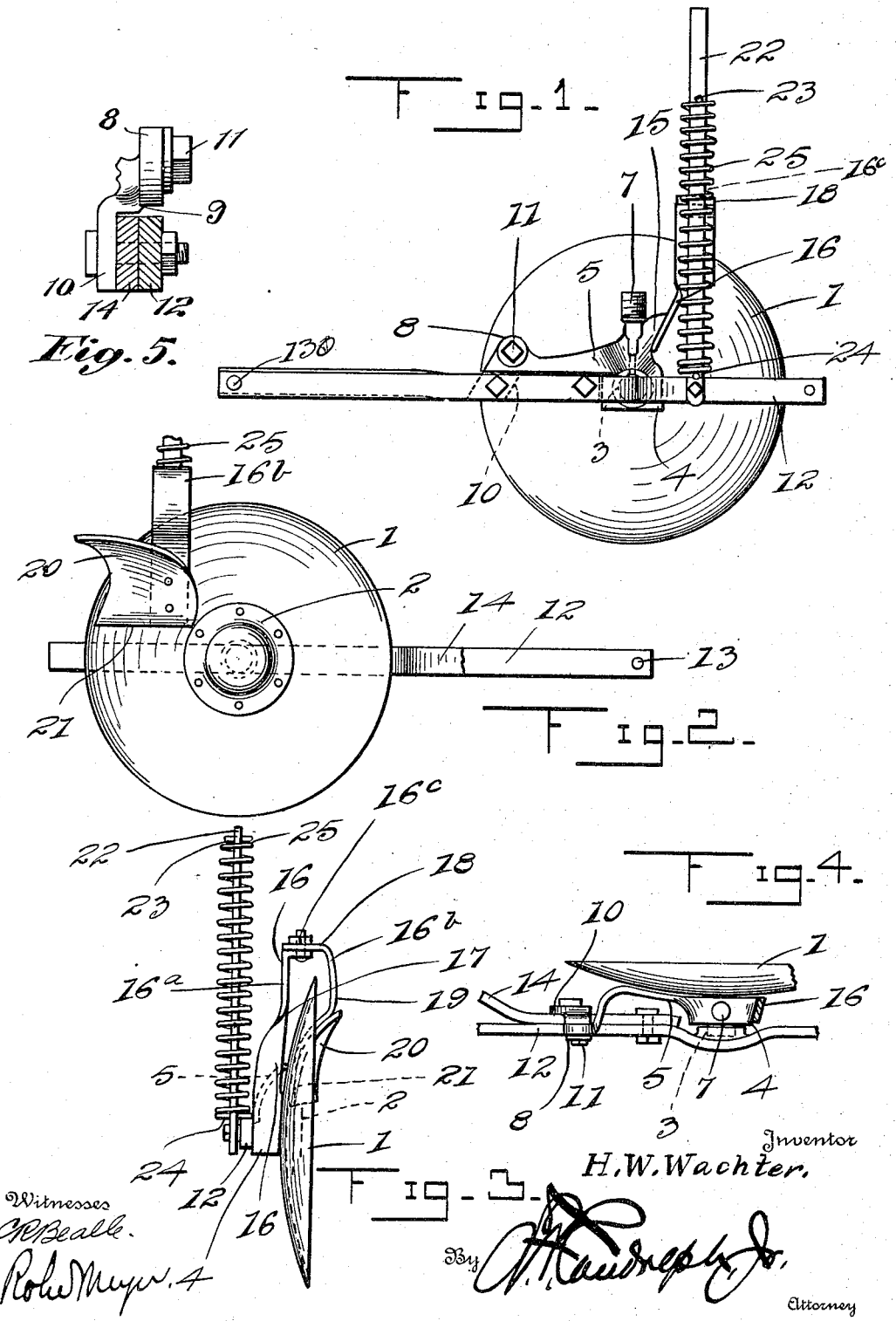

HEMME W. WACHTER, OF WILBUR, WASHINGTON.

DISK ATTACHMENT.

1,147,662.  Specification of Letters Patent.  Patented July 20, 1915.

Application filed January 19, 1915. Serial No. 3,093.

*To all whom it may concern:*

Be it known that I, HEMME W. WACHTER, a citizen of the United States, residing at Wilbur, in the county of Lincoln and State of Washington, have invented certain new and useful Improvements in Disk Attachments; and I do hereby declare the following to be a full, clear, and exact description of the invention, such as will enable others skilled in the art to which it appertains to make and use the same.

This invention relates to disks for attachment to various types of agricultural implements, such as disk cultivators, seeders, or disk harrows, and the primary object of the invention is to provide a novel form of attachment for a disk for attaching the same to various types of agricultural implements.

Another object of this invention is to provide a novel form of scraper for preventing the accumulation of soil upon the surfaces of the disks.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a side elevation of the improved disk attachment. Fig. 2 is a side elevation of the improved disk attachment looking at the opposite side, from that illustrated in Fig. 1. Fig. 3 is an edge view of the disk attachment, and Fig. 4 is a fragmentary top plan view. Fig. 5 is a fragmentary perspective view of a part of the construction of the disk attachment.

Referring more particularly to the drawings, 1 designates a disk of the ordinary construction used in connection with various types of agricultural implements, which is concavo-convex and has its periphery sharpened. The disk 1 has a collar or washer 2 secured to its central axis to which collar is attached a spindle 3 which projects transversely from the convex base of the disk and is provided for rotatably supporting the same. The spindle 3 of the disk 1 is seated in a boxing or bearing 4 which is formed upon a scraper blade 5. The scraper blade 5 is constructed of a casting and it has a boxing 4 secured to or formed integrally upon the under surface of the rear end thereof, as is clearly shown in Figs. 1 and 4 of the drawings. The scraper 5 is provided with a lubricating duct 6 extending downwardly therethrough which has communication with a lubricating cup 7 to provide for the lubrication of the bearing of the spindle 3 within the boxing 4.

The scraper blade 5 projects forwardly from the boxing 4 and has an upstanding enlargement 8 formed upon the upper surface of its forward end, which upstanding projecting portion is provided with a facial recess 9 in which is seated the upper end of a plate 10. The plate 10 is secured to the scraper 5 by a bolt or analogous fastening device 11. The plate 10 has its lower end secured to a jointer bar 12, which is constructed of a piece of flat metal and extends forwardly of the disk 1, having an opening 13 formed in its forward end to provide for the attaching or connecting of the disk to a suitable type of agricultural implement. The jointer bar 12 has a second bar 14 secured thereto and bent outwardly forming a forked bar for connecting the same. The scraper 5 has the section of its upper edge intermediate of the projection 8 and the lubricating cup 7 sharpened and lying in abutting engagement with the convex surface of the disk 1, for preventing accumulation of soil upon the surface of the disk during the operation of the same.

The scraping blade 5 has an upstanding projection 15 formed upon its rear end and extending upwardly from the boxing 4, which projection has its rear face flattened for providing for the securing thereto of a plate 16, which is substantially U-shaped in cross section and is twisted intermediate the ends of one leg thereof as is shown at 17, so that the U-shaped plate will extend over the disk 1 as is clearly shown in Fig. 3 of the drawings, having its apex 18 spanning the disk. The lower end of the leg 19 of the U-shaped plate 16 is curved inwardly and has a scraping blade 20 secured thereto. The scraping blade 20 is curved similar to the curvature of an ordinary breaking plow mold board so as to provide for the proper carrying away of soil from the disk. The scraper blade 20 has its lower edge 21 curved and positioned in abutting engagement with the concave surface of the disk 1 as is clearly shown by reference to the drawings.

In the drawings, the U-shaped plate or bracket 16 is shown composed of a pair of plates 16ᵃ and 16ᵇ which are connected at the apex of the bracket by bolts or suitable fastening device 16ᶜ, but it is to be understood that this bracket may be constructed of a single plate if it is so desired without departing from the spirit of this invention.

The plate or bar 12 has secured thereto, rearwardly of the scraping plate 5 a bar 22, which extends upwardly therefrom and is provided for connection to any part of an agricultural implement as heretofore mentioned. The bar 22 has a pair of pins 23 and 24 extending transversely therethrough, the pin 23 being positioned a short distance downwardly from the upper end of the bar while the pin 24 is positioned upwardly a short distance from the lower end of the bar. A shock absorbing spiral spring 25 is coiled about the rod 22 to cushion the vertical movement of the disk and the jointer mechanism connected thereto.

In reducing the invention to practice certain minor features of construction, combination and arrangement of parts may necessitate alterations to which the patentee is entitled provided such alterations are comprehended within the scope of what is claimed.

What is claimed is:—

1. The combination with an ordinary agricultural concavo-convex disk having a spindle extending transversely from one side thereof, of a scraper blade having a scraping edge lying in abutting engagement with the convex surface of said disk, a boxing formed upon said scraper blade and forming a bearing for said disk, a U-shaped bracket secured to said boxing and extending upwardly therefrom and across said disk, a scraper blade secured to one end of said U-shaped bracket and abutting the convex surface of said disk, said last named scraper blade being curved outwardly for guiding the soil from said disk surface.

2. The combination with an ordinary agricultural concavo-convex disk having a spindle carried thereby, of a scraper blade having a scraping edge alined in abutting engagement with convex surface of said disk, a boxing formed integrally with said scraper blade and forming a bearing for said disk spindle, a projection formed upon said boxing, a U-shaped bracket having one end of one leg secured to said projection, said U-shaped bracket extending upwardly and across said disk and having its free leg extending downwardly upon the opposite side of said disk from said first named scraper blade, a second scraper blade secured to the free end of said U-shaped bracket and being curved for guiding the soil from the concave surface of said disk, and means for connecting said disk to an agricultural implement.

3. The combination with an ordinary concavo-convex agricultural disk having a spindle carried thereby, of a jointer mechanism comprising a pair of bars, said bars being connected and having their forward ends spaced from each other for forming a fork, a vertically extending rod secured to the rear end of one of said bars, and a shock absorbing spiral spring wound about said rod, a scraper blade having a projection formed upon the forward end thereof, a plate connected to said projection and to one of said jointer bars, said scraper blade having a scraping surface lying in abutting engagement with the convex surface of said disk, a boxing formed upon said scraper blade and forming a bearing for said spindle, a projection formed upon said boxing, a U-shaped bracket secured to said projection and extending upwardly and across said disk having its free end positioned upon the opposite side of said disk from said first named scraper blade, a second scraper blade secured to the free end of said oppositely positioned leg of said bracket, said second named scraper blade being curved outwardly for guiding soil from the concave surface of said disk.

In testimony whereof I hereby affix my signature in presence of two witnesses.

HAM W. WACHTER.

Witnesses:
J. G. NICHOLS,
H. W. TAYLOR.